US012764570B2

(12) United States Patent
Abu-Suleiman et al.

(10) Patent No.: US 12,764,570 B2
(45) Date of Patent: Oct. 13, 2026

(54) ASSESSING CELLULAR BASE STATION PERFORMANCE

(71) Applicant: Rakuten Symphony, Inc., Tokyo (JP)

(72) Inventors: Ghaith Abu-Suleiman, San Mateo, CA (US); KrishnaKumar Gopalan Kesavan, Tracy, CA (US)

(73) Assignee: Rakuten Symphony, Inc., Tokyo (JP)

(*) Notice: Subject to any disclaimer, the term of this patent is extended or adjusted under 35 U.S.C. 154(b) by 0 days.

(21) Appl. No.: 17/921,525

(22) PCT Filed: Oct. 19, 2022

(86) PCT No.: PCT/US2022/047142

§ 371 (c)(1),
(2) Date: Oct. 26, 2022

(87) PCT Pub. No.: WO2024/085870

PCT Pub. Date: Apr. 25, 2024

(65) Prior Publication Data

US 2025/0254543 A1 Aug. 7, 2025

(51) Int. Cl.
*H04W 24/06* (2009.01)

(52) U.S. Cl.
CPC .................................. *H04W 24/06* (2013.01)

(58) Field of Classification Search
CPC ..... H04W 24/02; H04W 24/00; H04W 24/08; H04W 4/025; H04W 16/24; H04W 16/00; H04W 24/06; H04B 7/00; H04B 7/0639; H04B 7/0413; H04B 7/024; H04B 17/373; H04L 41/147; H04L 43/08; H04L 41/0816; G06N 20/00
See application file for complete search history.

(56) References Cited

U.S. PATENT DOCUMENTS

2016/0162783 A1 6/2016 Tan et al.
2016/0286411 A1 9/2016 Tarraf et al.
(Continued)

OTHER PUBLICATIONS

Admin. "Tutorial Example: Understand Cosine Similarity: A Beginner Guide—Machine Learning Tutorial". Sep. 28, 2020. Web. URL: https://www.tutorialexample.com/understand-cosine-similarity-softmax-a-beginner-guide-machine-learning. See entire document.

*Primary Examiner* — Nizar N Sivji
(74) *Attorney, Agent, or Firm* — David R. Stevens; Stevens Law Group

(57) ABSTRACT

The present invention extends to methods, systems, and computer program products for assessing cell base station performance. In one aspect, an intelligent quantitative performance index is used for assessing cell base station performance. Assessing cellular base station performance can include identifying underperforming cellular base stations and predicting cellular base station performance. Artificial Intelligence (AI) can be utilized to identify performance similarities among geographically segregated cellular base stations. AI can be used to derive dynamic scores adapting to different cellular traffic patterns and using smart thresholds. AI models can consider time of a metric degradation for impacting scores/indexes. Aspects can be used to help network operations teams maintain cellular networks and provide upper management a quantitative view of cellular network performance.

20 Claims, 8 Drawing Sheets

(56) References Cited

U.S. PATENT DOCUMENTS

| | | | |
|---|---|---|---|
| 2016/0381580 | A1 | 12/2016 | Kwan |
| 2017/0034720 | A1 | 2/2017 | Gopalakrishnan et al. |
| 2018/0220314 | A1 | 8/2018 | Chen et al. |
| 2020/0120458 | A1 | 4/2020 | Aldana et al. |
| 2022/0264326 | A1 | 8/2022 | Medithe et al. |
| 2022/0400394 | A1 * | 12/2022 | Eleftheriadis ......... H04L 41/145 |
| 2023/0052255 | A1 * | 2/2023 | He ........................... G06N 5/04 |
| 2024/0193432 | A1 * | 6/2024 | Bean ...................... G06N 20/00 |

* cited by examiner

ASSESSING CELLULAR BASE STATION PERFORMANCE

CROSS-REFERENCE TO RELATED APPLICATIONS

Not applicable.

BACKGROUND

1. Field of the Invention

This invention relates generally to the field of cellular communication, and, more particularly, to assessing cellular base station (e.g., cell tower) performance.

2. Related Art

Existing cellular Network Operations Teams rely on alarms and some Key Performance Indicators (KPIs) with static thresholds to monitor and maintain cellular network performance. For some cellular networks, numerous KPIs must be monitored daily for a significant number of cellular base stations (e.g., cell towers).

BRIEF DESCRIPTION OF THE DRAWINGS

The specific features, aspects and advantages of the present invention will become better understood with regard to the following description and accompanying drawings where.

DETAILED DESCRIPTION

Figure 1:
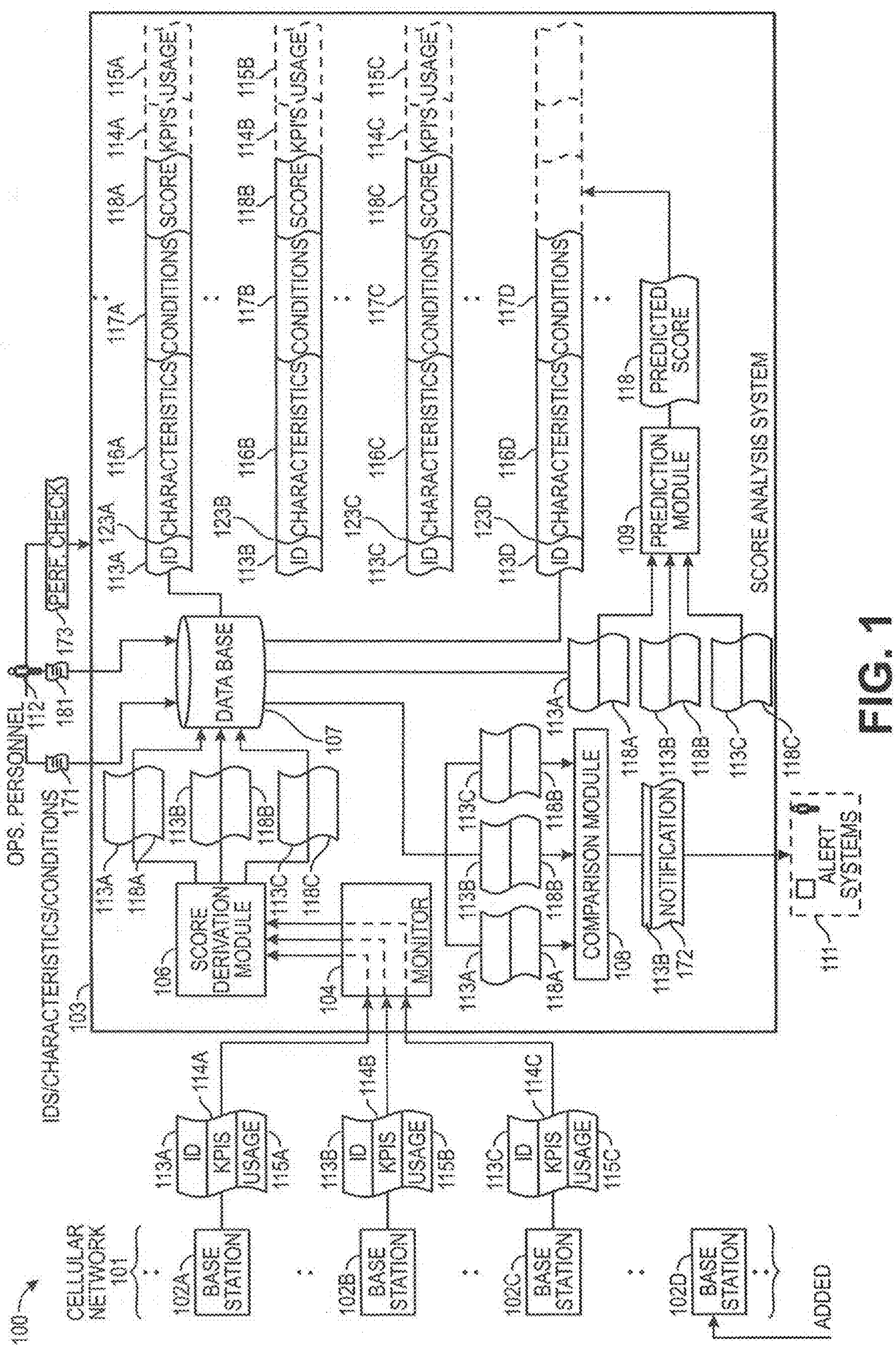
FIG. 1 illustrates an example cellular network architecture that facilitates assessing cellular base station performance.

The present invention extends to methods, systems, and computer program products for assessing cell base station performance. In one aspect, an intelligent quantitative performance index is used for assessing cell base station performance. Assessing cellular base station performance can include identifying underperforming cellular base stations and predicting cellular base station performance.

Numerous counters and Key Performance Indicators (KPIs) are available for cellular base station (cell tower) performance. Anomaly detection using KPIs can provide relative quick indications of problems but not necessarily solutions. Multiple scenarios for drilling down into root causes of problems can take a significant amount of time.

Further, little work has been done to combine KPIs into a single score using simple moving averages and busy hour focus. For example, existing metrics typically cannot be used to predict the expected performance of a new cellular base station (cell tower) or ideal performance of an existing cellular base station (cell tower) by learning from the behavior of other similar cell base stations. Indexes and scores can be significantly impacted due to network element glitches. Further, index and score generation techniques typically do not consider metric changes due to customer behavior, such as, bust hour traffic.

Aspects of the invention use artificial intelligence (AI) to derive a more efficiently and effectively (e.g., intelligent quantitative) performance index for a cellular base station (cell tower). AI can be utilized to identify leading (performance) indicators in cellular network metrics. AI can be utilized to identify performance similarities among geographically segregated cellular base stations (cell towers). AI can be used to scale for any cellular network size. AI can be used to derive dynamic scores adapting to different cellular traffic patterns and using smart thresholds. AI models can consider time of a metric degradation for impacting scores/indexes.

Aspects of the invention can improve overall customer satisfaction and perception of a cellular network. Improvements can be facilitated by one or more of: identifying cellular base stations (cell towers) not delivering optimum performance, predicting newly designed cellular base station (cell tower) performance, or predicting cellular base station (cell tower) failure and/or downtime through repeated performance patterns. Aspects can be used to help network operations teams maintain cellular networks and upper management a quantitative view of cellular network performance.

An AI model can be used to selected relevant leading performance indicators (e.g., KPIs). The AI model can define a range of healthy vales for metrics. The AI model can create a score for each cellular base station (cell tower) individually. Per cellular base station (cell tower), the AI model can compare the score for that cellular base station (cell tower) with scores of other cellular base stations (cell towers) having similar geography and/or similar traffic patterns. From comparisons, the AI model can determine if a cellular base station (cell tower): (1) is (or is not) performing as intended, (2) is (or is not) performing within specified parameters, (3) is (or is not) delivering appropriate (e.g., optimum) performance, etc. Also from comparisons, the AI model can predict cellular base station (cell tower) performance and predict cellular base station (cell tower) failures and downtimes through repeated performance patterns. In one aspect, the AI model more specifically predicts the performance of a newly designed cellular base station (cell tower).

More specifically, in some aspects, vectorized scores can be created for each cellular base station (cell tower). A vectorized score can indicate the magnitude of a (e.g., performance or health) degradation along with a (e.g., main or primary) component (or components) causing the degradation. AI based threshold alarming can be used for scores. Per cellular base station (cell tower), scores can vary across a cellular network. Unsupervised learning can provide insights for achievable improvement in scores. Aspects provide a foundation to build more intelligence from cases learned with existing scores and auto generate corresponding alarms. Healthy cells with chronic underperformance can be more quickly identified and solutions recommended. Recommendations can be based on comparison with other similar cellular base stations (cell towers), for example, other cellular base stations (cell towers) with similar traffic patterns, clutter, height, antenna types and patterns, etc.

In this description and the follow claims, "cellular base station" is defined as a cellular-enabled mobile device site including antenna and electronic communications equipment to create a cell or adjacent cells in a cellular network.

A cellular base station can include one or more sets of transceivers, digital signal processors, control electronics, GPS receivers, primary and backup electrical sources, sheltering, etc. A mobile phone (cell phone) communicates with a cellular base station wirelessly (via radio waves). The cellular base station in turn connects the mobile phone to the wired public switched telephone network (PSTN), the internet or to other cellphones within the cellular base station.

Cellular base stations can range from large cell towers that cover many miles to microcells in urban environments that only cover a few blocks. Telcos can install these base stations onto dedicated towers or attach them to existing structures. Many towers are camouflaged to blend in with their surroundings. For example, some can be painted and shaped to look like a large tree, while others may be inside a façade of a building's steeple or a rooftop water tower. Often a single cell tower contains radios and equipment for several service providers.

The size of the cellular base station or cell tower depends on the size of the area covered, the number of clients supported and the local geography. Cellular base station is defined to include cell towers, macrocells, microcells, small cells, and femtocells. Cellular base stations can be designed and/or configured to provide any cellular services, including any of 3G, 4G, LTE, 5G, 6G, etc. services on corresponding networks including any of 3G, 4G, LTE, 5G, 6G, etc. networks.

Cellular base stations performance can be measured by monitoring various Key Performance Indicators (KPIs). KPIs can be utilized to monitor and optimize radio network performance, to detect performance related issues, and to provide radio frequency planners with information. In general, cellular KPIs can be categorized into subcategories including: accessibility, retainability, integrity, availability, and mobility. 5G KPIs can also be grouped into the following categories including: Enhanced mobile broadband (EMBB), Ultra-reliable and low-latency communications), and Massive machine type communications (mMTC). More specifically, 5G KPIs can include: peak data rate, peak spectral efficiency, data rate experience by user, area traffic capacity, latency (user plane), connection density, average spectral efficiency, energy efficiency, reliability, mobility, mobility interruption time, bandwidth (maximum aggregate system), etc.

In general, cellular base station performance can vary based on different cellular base station characteristics and/or conditions including one or more and/or different combinations of: utilized hardware and software, geography, climate, weather, date/time, etc.

Cellular base stations can be placed in various geographies and can handle different cellular traffic patterns at different dates/times. Different geographies can include one or more and/or different combinations of: flat, hilly, mountainous, urban, rural, costal, inland, different climates, etc. Different climates can include one or more and/or different combinations of: tropical (wet and wet/dry), dry/desert (arid and semi-arid), moderate/temperate (Mediterranean, human subtropical, marine), continental (human continental, subarctic), polar (tundra, ice cap, highlands, non-permanent ice), etc. Different geographies can also experience different weather conditions at different times, including one or more and/or different combinations of: humidity, temperature, rain, hail, sleet, snow, fog, smog, drought, sandstorms, wind (speed, direction), lightning, storms, hurricanes, tornadoes, barometric pressure, etc. Dates/times can include one or more and/or different combinations of: rush hour, non-rush hour, weekday, weekend, holiday, non-holiday, night, day, business hours, non-business hours, winter, summer, spring, fall, etc.

Cellular providers can include a plurality of cellular base stations forming a cellular network. Cellular base stations can be positioned relative to one another to maximize cellular network coverage based on one or more and/or different combinations of: geography, climate, weather conditions, different dates/times, etc. As a cellular provider expands, the cellular provider can also add new cellular base stations. New cellular base stations can be positioned relative to one or more existing cellular base stations to further maximize cellular network coverage based on one or more and/or different combinations of: geography, climate, weather conditions, different dates/times, etc.

Within a cellular network, cellular base station usage and/or cellular base station KPIs can vary over time based on various characteristics, including geography, climate, weather conditions, and different dates/times. Per cellular base station within a cellular network, components of the invention can monitor cellular base station usage and/or cellular base station KPIs overtime and/or on an ongoing basis. Also, per cellular base station, monitored cellular base station usage and/or cellular base station KPIs can be mapped to geography, climate, weather conditions, date/times, etc. overtime and/or on an on-going basis.

From monitored base station usage and/or monitored base station KPIs, components of the invention can derive an overall "performance score" per cellular base station. Derived performance scores for different cellular base stations can be stored in a database and used to compare cellular base station performance among cellular base stations within a cellular network. In an automated and/or manual fashion, performance scores can be derived, updated, and stored at specified intervals, on an ongoing basis, in response to user commands, etc.

Components can compare performance scores of different similarly situated cellular base stations to gauge (e.g., relative) performance. Similarly situated cellular base stations can be cellular base stations having similar geographies, climates, weather conditions, dates/times, etc.

The performance score comparison can be used to identify and/or predict potential cellular performance degradation. For example, when comparing performance scores for a plurality of similarly situated cellular base stations (i.e., cellular base stations having similar characteristics and/or associated with similar conditions), underperforming cellular base stations can be identified. An underperforming cellular base station can be identified when its performance score varies by more than a specified threshold (e.g., in magnitude or percentage) from the performance score of one or more other similarly situated cellular base stations.

When a new cellular base station is installed in a cellular network, components can derive a predicted performance of the new cellular base station. Components can identify characteristic and/or conditions of the new cellular base station. The components can query a database of existing cellular base stations in the cellular network for similarly situated cellular base stations (i.e., cellular base stations having similar characteristics and/or conditions). The components can access derived performance scores for the similar situated cellular base stations. The components can predict performance of the new cellular base station based on performance scores for the similarly situated cellular base stations. For example, various statistically mechanisms, such as, for example, mean, median, mode, etc. can be applied to the accessed performance scores to predict a performance score for the new cellular base station.

As described, similarly situated cellular base stations can include cellular base stations having similar characteristics and/or associated with similar conditions. Cellular base station characteristics can include at least: utilized hardware, utilized software, physical geography, and climate. Cellular base stations having similar characteristics can include cellular base station having a requisite and/or a threshold similarity in their characteristics. Cellular base stations need not have identical characteristics to be viewed as having similar characteristics. For example, hardware and software may be considered similar based on version or release dates and/or version or release numbers. Different types of physical geographies may be considered similar. For example, hilly and mountainous may be considered similar. Different types of climates may also be considered similar. For example, arid and semi-arid may be considered similar.

A cell network operator (or other user) can create, configure and/or select rules defining what is a requisite/threshold similarity between one or more or some combination of cellular base station characteristics, including: hardware, software, physical geography, and climate for cellular base stations to be viewed as having “similar” characteristics. The rules can be applied to characteristics of different cellular base stations to determine if the characteristics have a requisite/threshold similarity. There may be some variation in characteristics even between cellular base stations considered to have “similar” characteristics.

Conditions associated with a cellular base station can include at least: weather and date/time. Cellular base stations associated with similar conditions can include cellular base stations having a requisite and/or threshold similarity in their associated conditions. Cellular base stations need not have identical associated conditions to be viewed as having similar associated conditions. Different weather conditions may be considered similar. For example, sleet and hail may be considered similar, a temperature of 90 and a temperature of 88 may be considered similar, fog and smog may be considered similar, etc. Different date/times may also be considered similar. For example, usage on Memorial Day may be considered similar to usage on Labor Day.

A cell network operator (or other user) can create, configure and/or select other rules defining what is a requisite/threshold similarity between one or more or some combination of cellular base station associated conditions, including: weather and date/time for cellular base stations to be viewed as having “similar” associated conditions. The other rules can be applied to associated conditions of different cellular base stations to determine if the associated conditions have a requisite/threshold similarity. There may be some variation in associated conditions even between cellular base stations are considered to have “similar” associated conditions.

In some aspects, to be considered “similar” cellular base stations, cellular base stations have both similar characteristics and similar associated conditions. A cell network operator (or other user) can create, configure and/or select further rules defining a requisite/threshold characteristic similarity and a requisite/threshold associated condition similarity for cellular base stations to be considered “similar”. Cellular base stations need not have identical characteristics and/or need not have identical associated conditions to be viewed as being “similar”. The further rules can be applied to characteristics and associated conditions of cellular base stations to determine if the cellular base stations have a requisite/threshold similarity. There may be some variation in characteristics and/or associated conditions even between cellular base stations considered to be “similar”.

In one aspect, performance scores are represented by a number (e.g., 1, 5.6, 27, 3857, 835.24) etc. It may be that higher performance scores indicate higher performing cellular base stations and lower performance scores indicate lower performing cellular base stations. Alternatively, it may be that lower performance scores indicate higher performing cellular base stations and higher performance scores indicate lower performing cellular base stations. Other performance score formats, for example, alpha numeric codes, can also be used. Performance score comparisons, indications, and predictions can be tailored based at least in part on performance score format.

FIG. 1 illustrates an example cellular network architecture 100 that facilitates assessing cellular base station performance. As depicted, cellular network architecture 100 includes cellular network 101, score analysis system 103, alert systems 111, and operations personnel 112. Cellular network 101 further includes cellular base stations 102A, 102B, 102C, etc. Cellular network 101 can be any kind of cellular network including but not limited to a 3G, 4G, LTE, 5G, 6G, etc. network. Thus, cellular base stations 102A, 102B, 102C, etc. can implement protocols and services for implementing any kind of cellular network including but not limited to a 3G, 4G, LTE, 5G, 6G, etc., network. Score analysis system 103 further includes monitor 104, score derivation module 106, database 107, comparison module 108, and prediction module 108.

Operations personnel 112 can enter (all at once or portions at different times) ID's, characteristics, and conditions 171 into database 107. ID's, characteristics, and conditions 171 can include assigned ID's 113A, 113B, and 113C for cellular base stations 102A, 102B, and 102C respectively. ID's, characteristics, and conditions 171 can include assigned characteristics 116A, 116B, and 116C for cellular base stations 102A, 102B, and 102C respectively. ID's, characteristics, and conditions 171 can include assigned associated conditions 117A, 117B, and 117C for cellular base stations 102A, 102B, and 102C respectively. Data contained in ID's, characteristics, and conditions 171 can be stored in database records 123A, 123B, and 123C for cellular base stations 102A, 102B, and 102C respectively.

In general, during operation and by base station ID, monitor 104 can monitor KPIs and usage of cellular base stations. Monitor 104 can monitor base station KPIs and usage at specified intervals, from time to time, on an ongoing basis, or in response to user commands. bast station ID, monitor 104 can send monitored KPIs and usage by base station ID to score derivation module 106. By base station ID, score derivation module 106 can derive a performance score from corresponding KPIs and usage. By base station ID, score derivation module 106 can store a derived performance score in database 107.

For example, monitor 104 can monitor ID 113A, KPIs 114A, and usage 115A from base station 102A. Monitor 104 can send ID 113A, KPIs 114A, and usage 115A to score derivation module 106. Score derivation module 106 can derive performance score 118A for base station 102A. Score derivation module can send ID 113A and performance score 118A to database 107. Database 107 can store performance score 118A in database record 123A. KPIs 114A and usage 115A can optionally be stored in database record 123A.

Likewise, monitor 104 can monitor ID 113B, KPIs 114B, and usage 115B from base station 102B. Monitor 104 can send ID 113B, KPIs 114B, and usage 115B to score derivation module 106. Score derivation module 106 can derive performance score 118B for base station 102B. Score derivation module can send ID 113B and performance score 118B to database 107. Database 107 can store performance score 118B in database record 123B. KPIs 114B and usage 115B can optionally be stored in database record 123B.

Similarly, monitor 104 can monitor ID 113C, KPIs 114C, and usage 115C from base station 102C. Monitor 104 can send ID 113C, KPIs 114C, and usage 115C to score derivation module 106. Score derivation module 106 can derive performance score 118C for base station 102C. Score derivation module can send ID 113C and performance score 118C to database 107. Database 107 can store performance score 118C in database record 123C. KPIs 114C and usage 115C can optionally be stored in database record 123C.

In general, comparison module 108 is configured to compare performance scores for similarly situated base stations. Based on comparisons, comparison module 108 can identify underperforming cellular base stations. For example, when a performance score deviates from other performance scores by a requisite amount or specific threshold, the cellular base station corresponding to the deviating performance score can be identified as underperforming.

In general, prediction module 109 is configured to predict performance for a newly installed/operational cellular base station. In association with adding a new cellular base station, operations personnel 112 can add characteristics and associated conditions for the new cellular base station to database 107. Prediction module 109 can access performance score for other cellular base stations that are similarly situated to the new cellular base station. For example, prediction module 109 can query database for characteristics and/or associated conditions similar to those of the new cellular base station. From database records indicated similarly situation cellular base stations, prediction module 109 can access corresponding performance scores. From the access corresponding performance scores, prediction module 109 can predict a performance score for the new cellular base station (e.g., using mathematical and statistical operations).

Figure 2:
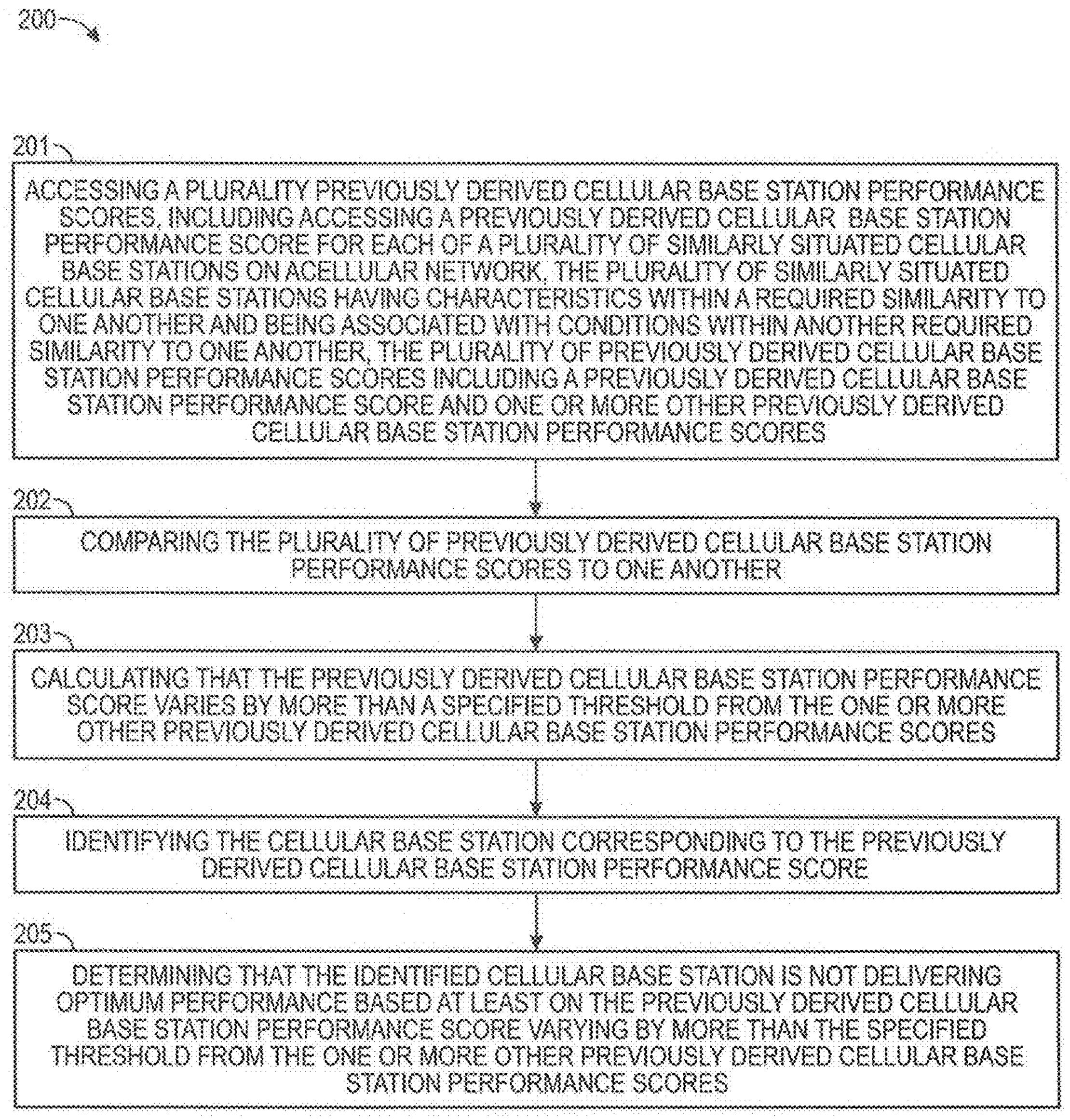
FIG. 2 illustrates a flow chart of an example method for detecting cellular base station underperformance.

FIG. 2 illustrates a flow chart of an example method 200 for detecting cellular base station underperformance. Method 200 will be described with respect to the components and data in cellular network architecture 100.

In one aspect, a manual or automated command can request a performance check of a plurality of similarly situated cellular base stations. For example, operations personnel 112 can submit request 173 to score analysis system 103 to request a performance check. Alternatively, a component in score analysis system 103 can request a performance in an automated manner, for example, in response to a detected performance condition, periodically, randomly, etc. A performance check request can indicate cellular base station characteristics and/or associated conditions. Similar situated cellular base stations can be identified based on characteristics and/or associated conditions indicated in the performance check request.

Method 200 includes accessing a plurality previously derived cellular base station performance scores, including accessing a previously derived cellular base station performance score for each of a plurality of similarly situated cellular base stations on a cellular network, the plurality of similarly situated cellular base stations having characteristics within a requisite similarity to one another and being associated with conditions within another requisite similarity to one another, the plurality of previously derived cellular base station performance scores including a previously derived cellular base station performance score and one or more other previously derived cellular base station performance scores (201).

For example, in response to a requested performance check, score analysis system 103 can identify database records of the similarly situated cellular base stations from within database 107. For example, components of score analysis system 103 identify cellular base stations 102A, 102B and 102C as similarly situated base stations based on characteristics 116A, 116B, and 116C and associated conditions 117A, 117B, and 117C. In one aspect, components at score analysis system 103 apply (e.g., user defined) rules to 116A, 116B, and 116C and associated conditions 117A, 117B, and 117C to identify cellular base stations 102A, 102B and 102C as similarly situated base stations. Comparison module 108 can then access ID 113A and score 118A, ID 113B and score 118B, and ID 113C and score 118C from database 107.

Method 200 includes comparing the plurality of previously derived cellular base station performance scores to one another (202). For example, comparison module 108 can compare scores 118A, 118B, and 118C to one another. Method 200 includes calculating that the previously derived cellular base station performance score varies by more than a specified threshold (e.g., magnitude or percentage) from the one or more other previously derived cellular base station performance scores (203). For example, comparison module can calculate that score 113B varies by more than a specified threshold from scores 113A and 113C.

Method 200 includes identifying the cellular base station corresponding to the previously derived cellular base station performance score (204). For example, comparison module 108 can identify that cellular base station 102B corresponds to score 113B. Method 200 includes determining that the identified cellular base station is not delivering optimum performance based at least on the previously derived cellular base station performance score varying by more than the specified threshold from the one or more other previously derived cellular base station performance scores (205). For example, comparison module 108 can determine that cellular base station 102B is not delivering optimum performance (or is underperforming) based on the performance score variation of score 113B.

Comparison module 108 can send notification 172 to alert systems 111 notifying alert systems that cellular base station 102B is not delivering optimum performance (or is underperforming). Personnel at alert systems 111 can then take corrective action to improve performance of cellular base station 102B.

Method 200 can be repeated to identify patterns of non-optimal and/or under performance at cellular base station 102B. Various repeated patterns of non-optimal and/or under performance can be used to predict failures and/or downtime at cellular base station 102B.

Figure 3:
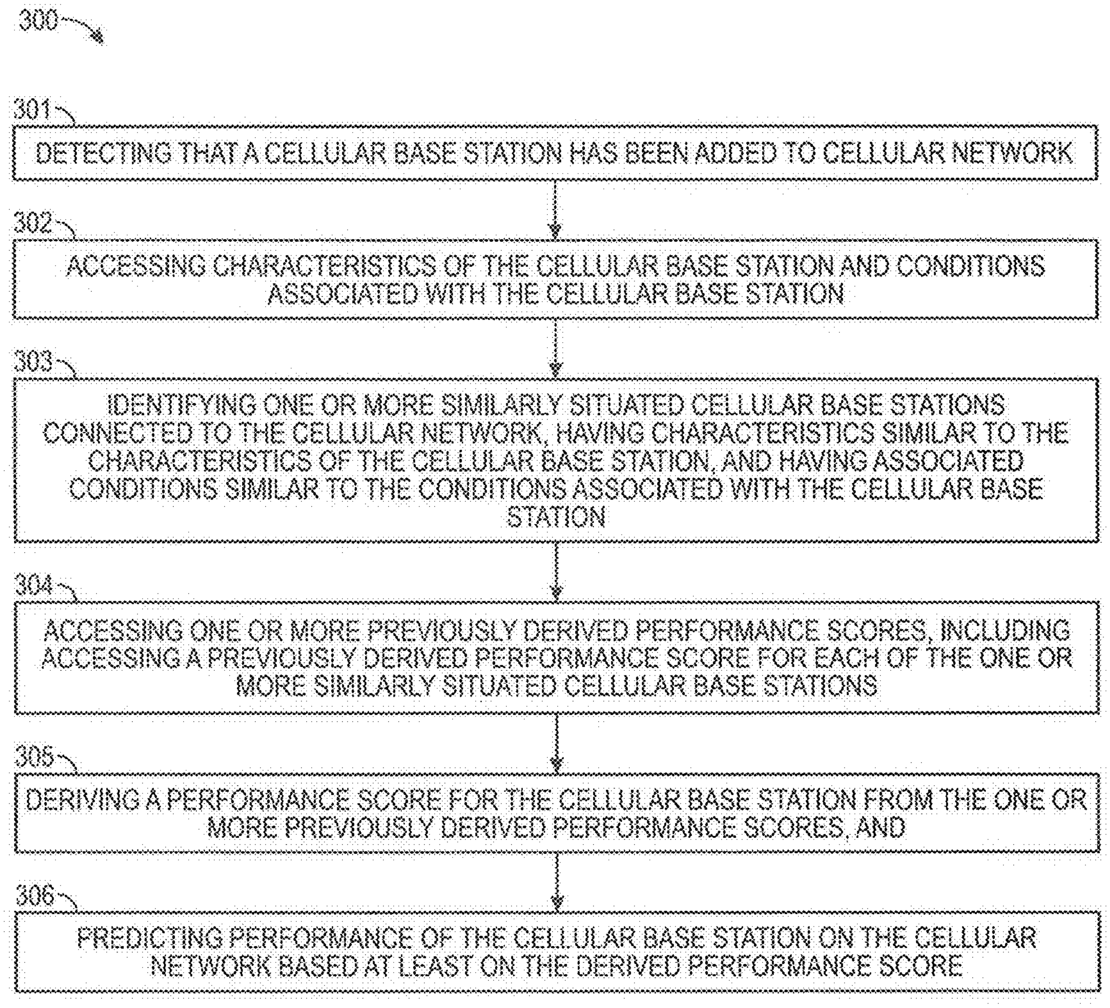
FIG. 3 illustrates a flow chart of an example method for predicting cellular base station performance.

FIG. 3 illustrates a flow chart of an example method for predicting cellular base station performance. Method 300 will be described with respect to the components and data in cellular network architecture 100.

Method 300 includes detecting that a cellular base station has been added to cellular network (301). For example, cellular base station 102D can be added to cellular network 101. Along with adding cellular base station 102D, operations personnel 112 can enter (all at once or portions at different times) ID's, characteristics, and conditions 181 into database record 123D. Database record 123D can include ID 113D (identifying cellular base station 102D), characteristics 116D (of cellular base station 102D), and conditions 117D (associated with cellular base station 102D). Components of score analysis system 103 can detect that database record 123D was added to database 107.

Method 300 includes accessing characteristics of the cellular base station and conditions associated with the cellular base station (302). For example, prediction module 109 can access characteristics 116D and conditions 117D from database 107.

Method 300 includes identifying one or more similarly situated cellular base stations connected to the cellular network, having characteristics similar to the characteristics of the cellular base station, and having associated conditions similar to the conditions associated with the cellular base station (303). For example, score analysis system 103 can identify database records of similarly situated cellular base stations from within database 107. For example, components of score analysis system 103 identify cellular base stations 102A, 102B and 102C as similarly situated to cellular base station 102D based on characteristics 116A, 116B, 116C, and 116D and associated conditions 117A, 117B, 117C, and 117D. In one aspect, components at score analysis system 103 apply (e.g., user defined) rules to 116A, 116B, 116C, and 116D and associated conditions 117A, 117B, 117C, and 117D to identify cellular base stations 102A, 102B and 102C as similarly situated to base station 102D.

Method 300 accessing one or more previously derived performance scores, including accessing a previously derived performance score for each of the one or more similarly situated cellular base stations (304). For example, prediction module 109 can then access ID 113A and score 118A, ID 113B and score 118B, and ID 113C and score 118C from database 107. Method 300 includes deriving a performance score for the cellular base station from the one or more previously derived performance scores (305). For example, prediction module 109 can derive predicted score 118D for cellular base station 102D from scores 118A, 118B, and 118C. Prediction module 109 can store predicted score 118D in database record 123D. Method 300 includes predicting performance of the cellular base station on the cellular network based at least on the derived performance score (306). Operations personnel (e.g., 112) can predict the performance of cellular base station 102D based on predicted score 118D.

Components of score analysis system 103 can utilize artificial intelligence (AI) to more efficiently and effectively derive a (e.g., intelligent quantitative) performance index for a cellular base station. Score analysis system 103 can utilize AI to identify leading (performance) indicators in cellular network metrics. Score analysis system 103, and more specifically comparison module 108, can utilize AI to identify performance similarities among geographically segregated cell base stations (cell towers). AI can be scaled for any cellular network size. Score analysis system 103 can use AI to derive dynamic scores adapting to different cellular traffic patterns and using smart thresholds. AI models can consider time of a metric degradation for impacting scores/indexes.

Aspects of the invention can improve overall customer satisfaction and perception of a cellular network. Improvements can be facilitated by one or more of: identifying cellular base stations not delivering optimum performance, predicting newly designed cellular base performance, or predicting cellular base station failure and/or downtime through repeated performance patterns. Aspects can be used to help network operations teams maintain cellular networks and provide upper management a quantitative view of cellular network performance.

Score analysis system 103 can use an AI model to select relevant leading performance indicators (e.g., KPIs). The AI model can define a range of healthy vales for metrics. The AI model can derive a performance score for each cellular base station individually. Per cellular base station, the AI model can compare the score for that cellular base station with scores of other cellular base stations having similar geography and/or similar traffic patterns. From comparisons, the AI model can determine if a cellular base station: (1) is (or is not) performing as intended, (2) is (or is not) performing within specified parameters, is (or is not) delivering appropriate (e.g., optimum) performance, etc. Also from comparisons, the AI model can predict cellular base station performance and predict cellular base station failures and downtimes through repeated performance patterns. In one aspect, the AI model more specifically predicts the performance of a newly designed cellular base station.

Portions of AI and AI models can be distributed across the components of score analysis system 103, including across monitor 104, score derivation module 106, database 107, comparison module 108, and prediction module 109. Accordingly, portions of AI and AI models can be used to implement methods of the invention or portions thereof, including methods 200 and 300.

Figure 4:
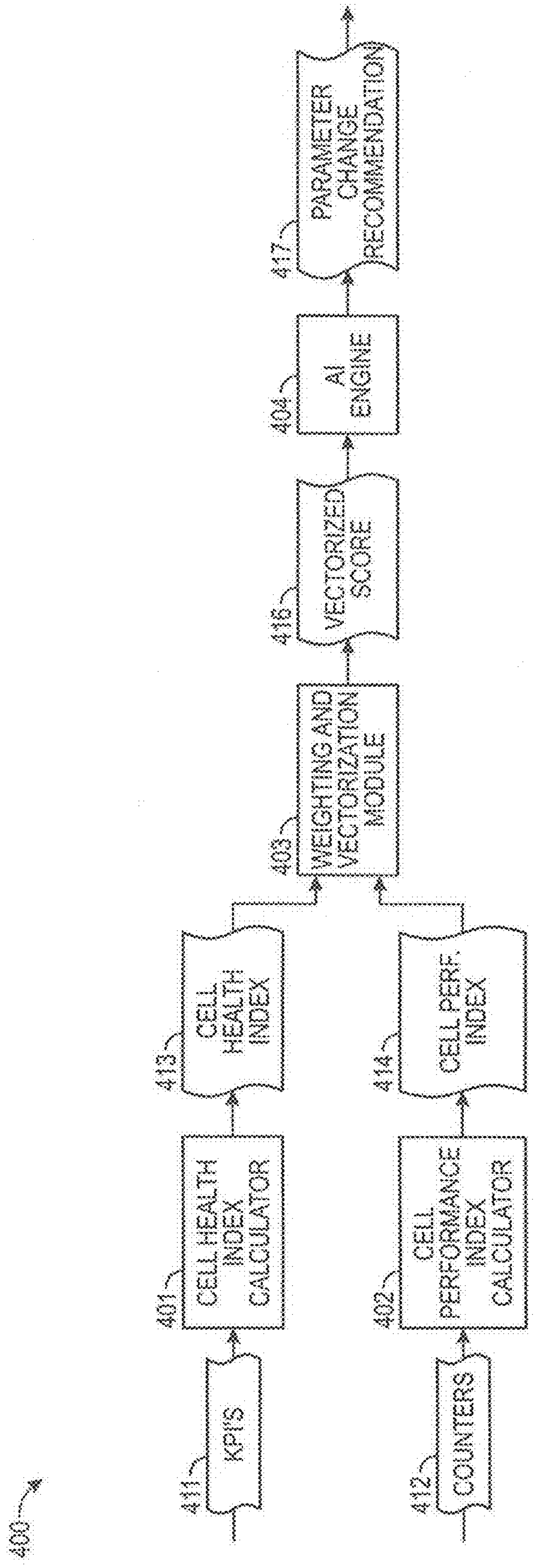
FIG. 4 illustrates a view of an example machine learning framework.

FIG. 4 illustrates a view of an example machine learning framework 400. As depicted, machine learning framework 400 includes cell health index calculator 401, cell performance index calculator 402, weighting and vectorization module 403, and AI engine 404.

Cell health index calculator 401 can receive KPIs 411 (e.g., obtained from monitoring a cellular base station). KPIs 411 can be similar to any of KPIs 114A, 114B, 114C, etc. Cell health index calculator 401 can calculate cell health index 413 (for the cellular base station) from KPIs 411. KPIs 411 can include any of a variety of KPIs, such as, for example, availability, Radio Resource Control (RRC) protocol success rate (RRC_SR), S1 connection success rate (S1_SR), S1 handover preparation phase success rate (S1_Inc_HO_Prep), X2 handover preparation success rate (X2HO_Prep), alarm recurrence rate, cell down rate, LTE service down rate, Remote Radio Head (RRH) Not discovered rate, sleep cell rate, Down Link (DL) Physical Resource Block (PRB) utilization, etc. as well as any other described KPIs. A corresponding KPI value can indicate KPI rates, occurrences, utilizations, etc. In one aspect, KPIs are represented by name/value pairs.

Cell health index calculator 401 can send cell health index 413 to weighting and vectorization module 403. Weighting and vectorization module 403 can receive cell health index 413 from cell health index calculator 401.

Cell performance index calculator 402 can receive counters 412 (e.g., obtained from monitoring the cellular base station). Counters can eb similar to any of usage 115A, 115B, 115C, etc. Cell performance index calculator 402 can calculate cell performance index 414 (for the cellular base station) from counters 412. Counters 412 can include any of a variety of counters in different categories, such as, for example, counters related to any: access failures, access rejections, usage, throughput, radio environment, transportation, etc. as well as another other described counters. Each counter category can include a plurality of counters for tracking counts of more specific cellular base station performance. For example, a counter value can indicate occurrences of a more specific cellular base station performance activity has occurred in a specified time period, since a last check, etc. In one aspect, counters are represented by name/value pairs.

Figure 7:
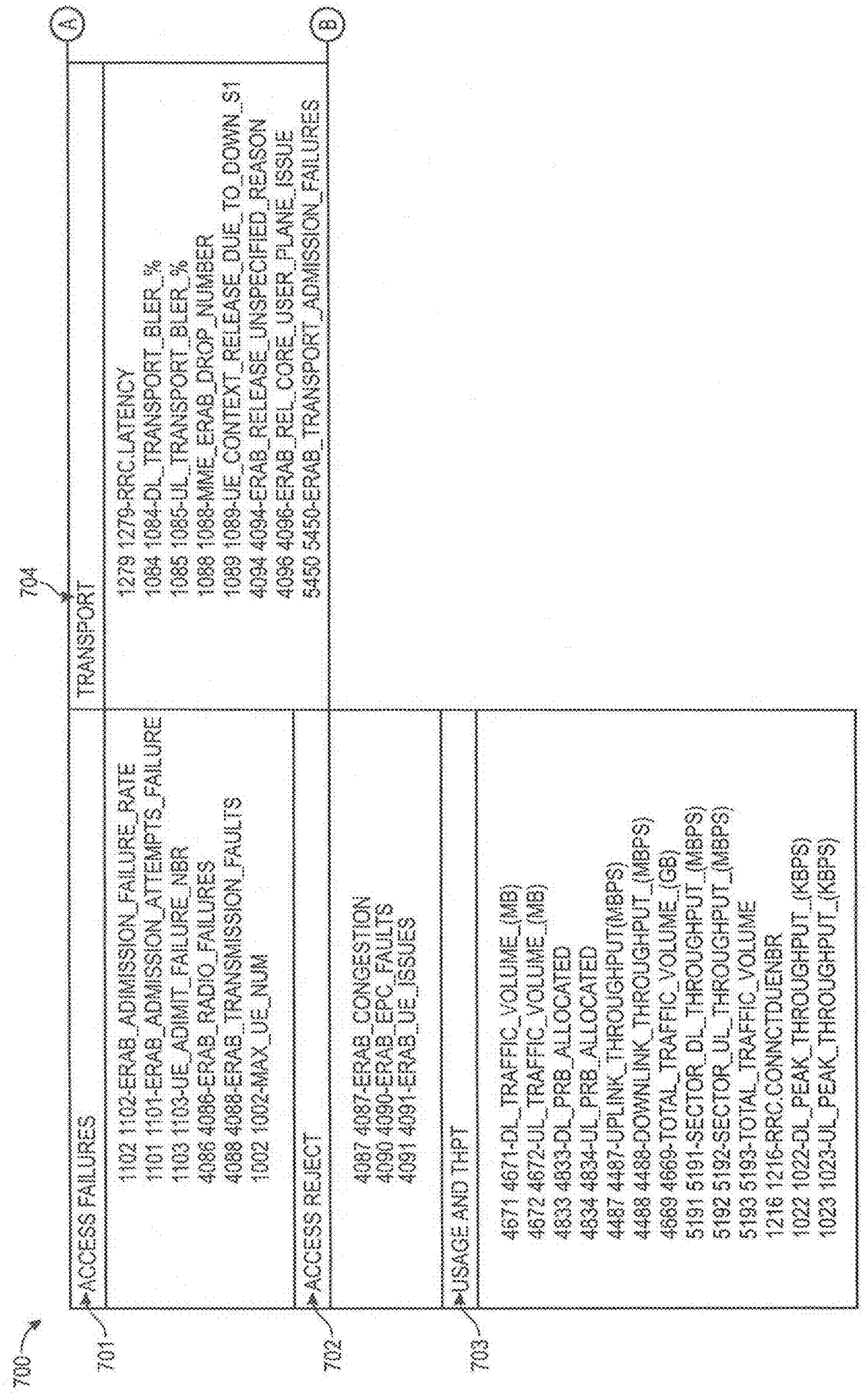
FIG. 7 illustrates an example counter categorization.
Figure 7:
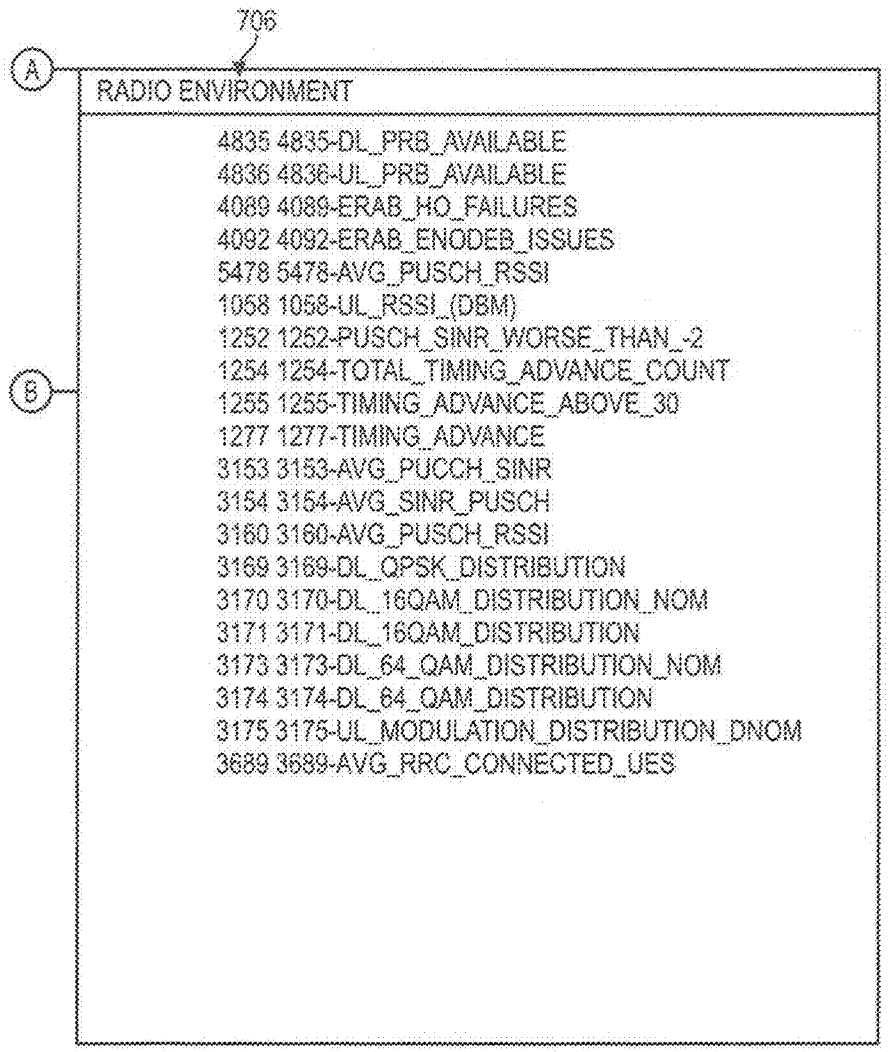

Turning briefly to FIG. 7, FIG. 7 illustrates an example counter categorization 700. As depicted, counter categorization 700 includes counters categorized into counter categories access failures 701, access reject 702, usage and throughput 703, transport 704, and radio environment 706. Within FIG. 7, ERAB stands for E-UTRAN Radio Access Bearer, UE stands for User Equipment, DL stands for Down Link, UL stands for Up Link, MME stands for Mobility Management Entity, PUSCH stands for Physical Uplink Shared Channel, PUCCH stands for Physical Uplink Control Channel, RSSI stands for Receive Signal Strength Indicator, and SINR stands for Signal to Noise Ratio. Other terms in FIG. 7 having meanings as otherwise described.

Returning to FIG. 4, any of the counters named in counter categorization 700 along with corresponding values can be included in counters 412.

Performance health index calculator 403 can send cell performance index 414 to weighting and vectorization module 403. Weighting and vectorization module 403 can receive cell performance index 414 from performance index calculator 402.

Weighting and vectorization module 403 can derive vectorized score 416 from cell health index 413 and cell performance index 414. Weighting and vectorization module 403 can use smarting weighting to derive a vectorized score having a number and a reason (e.g., KPI) causing degradation or improvement from the previous measurement score. Smart weighting of a score a cell performance index can be based on time duration of degradation and traffic/throughput impact.

In one aspect, the functionality of cell health index calculator 401, cell performance index calculator 402, and weighting and vectorization module 403 are integrated into score derivation module 106.

Weighting and vectorization module 403 can send vectorized score 416 to AI engine 404. AI engine 404 can receive vectorized score 416 from weighting and vectorization module 403. AI engine 404 can derive parameter change recommendation 417 from vectorized score 416. Parameter change recommendation 417 can indicate recommended changes to the parameters of a cellular base station. AI engine 404 can derive parameter change recommendation 417 for one cellular base station based on the performance of other (e.g., similarly situated) cellular base stations.

Figure 5:
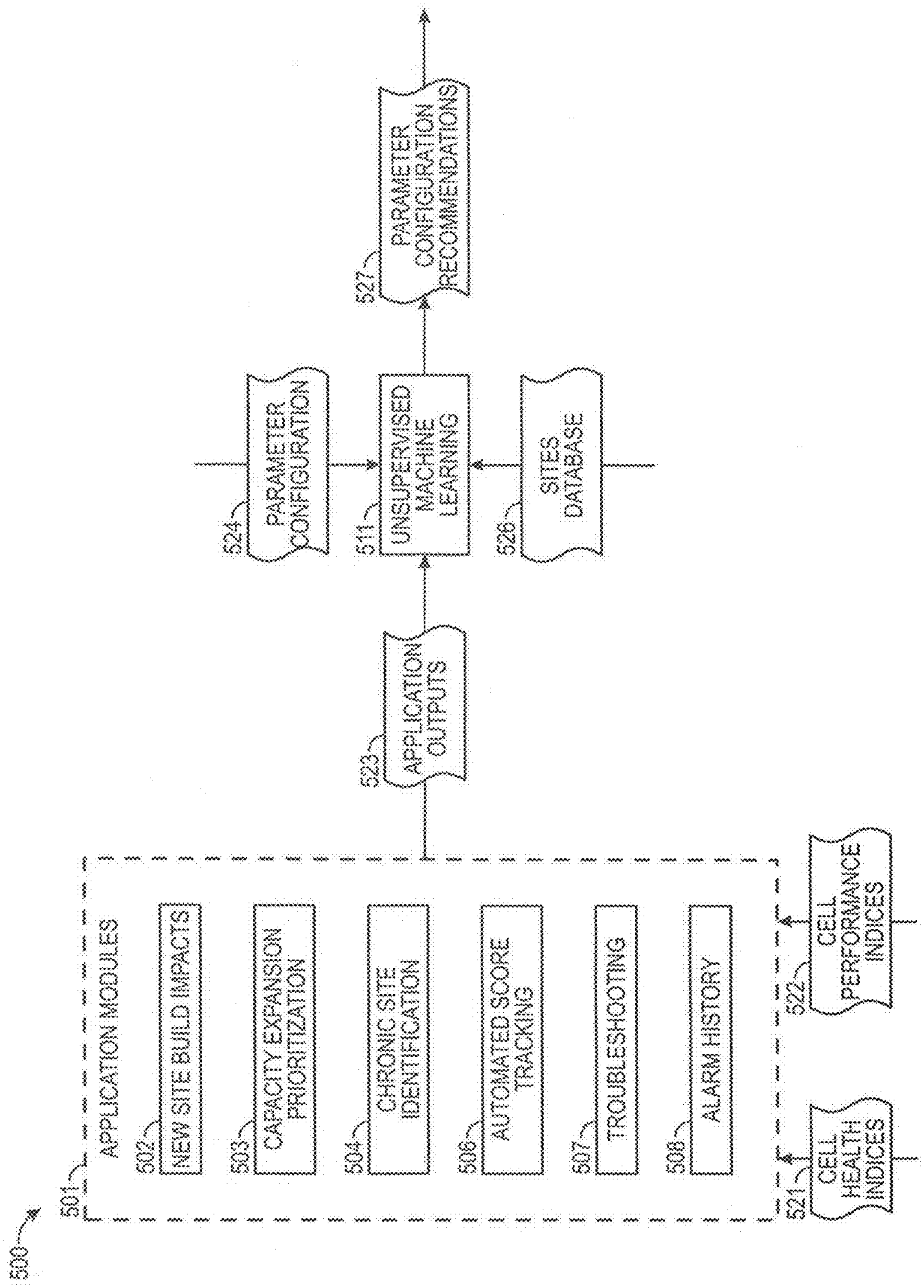
FIG. 5 illustrates another view of an example machine learning framework.

FIG. 5 illustrates another view of an example machine learning framework 500 As depicted, machine learning framework 500 includes application modules 501 and unsupervised machine learning 511. Application modules 501 further includes new site build impacts 502, capacity expansion prioritization 503, chronic site identification 504, automated score tracking 506, trouble shooting 507, and alarm history 508. Application modules 502 can receive cell health indices 521 and cell performance indices 522. Cell health indices 521 can include a cell health index for one or more cellular base stations of a cellular network. Cell performance indices 522 can include a corresponding cell performance index for the one or more cellular base stations of the cellular network.

Different components in application modules 501 can utilize cell health indices 521 and cell performance indices 522 to realize intended functionality. For example, new site build impacts 502 to determine a performance impact of a new cellular base station build on surrounding cellular base stations. Capacity expansion prioritization 503 can prioritize new sites, carrier adds, etc. Chronic site identification 504 can identify cellular base stations that are chronically underperforming. Automated score tracking 506 can track (e.g., vectorized) scores for cellular base stations before and after parameter changes at the cellular base stations. Trouble shooting 507 can trouble shoot cellular base stations. Alarm history 508 can track alarm history of cellular base stations. Collectively, one or more of application modules 501 can generate application output 523. Application modules 501 can send application outputs 523 to unsupervised machine learning 511. Unsupervised machine learning 511 can receive application outputs 523 from application modules 501.

Unsupervised machine learning 511 can also access parameter configuration 524, for example, for one or more cellular base stations on the cellular network. Unsupervised machine learning 511 can also access information form sites database 526. Sites database 526 can include cellular base station locations, cellular base station heights, cellular base station tilts, an antenna database, antenna azimuth separations, clutter, etc. Any of the information contained in sites database 526 may be included in database 107.

Unsupervised machine learning 511 can derive parameter configuration recommendations 527 from application outputs 523, parameter configuration 524, and information from sites database 526. Parameter configuration recommendations 527 can recommend parameter configure changes to improve overall average (e.g., vectorized) scores across the cellular network.

Unsupervised machine learning 511 can learn about and recommend parameter changes to improve cell performance indices relative to any of: cellular base station tilts, cellular base station tower heights, and clutter. Unsupervised machine learning 511 can learn about and recommend parameter changes to improve target cellular performance index scores. Unsupervised machine learning 511 can learn about and recommend parameter changes to improve minimum average cellular performance index scores. Unsupervised machine learning 511 can provide recommendations for achieving target cellular performance index scores. Unsupervised machine learning 511 can detect KPI patterns leading to alarms.

Unsupervised machine learning 511 can utilize a neural embedding module. A matrix format can be used for finding common cells having similar KPI behavior at the same time. A relevant embedding package can be loaded and an input matrix prepared. Unsupervised machine learning 511 can used a cosine similarity function to find similarities between two vectors, and thus similarities between two different cells. Thus, more generally, unsupervised machine learning 511 can be configured to identify similarly situated cellular base stations.

In one aspect, the functionality of AI engine 404 and/or unsupervised machine learning 511 is integrated into comparison module 108 and/or prediction module 109.

Figure 6:
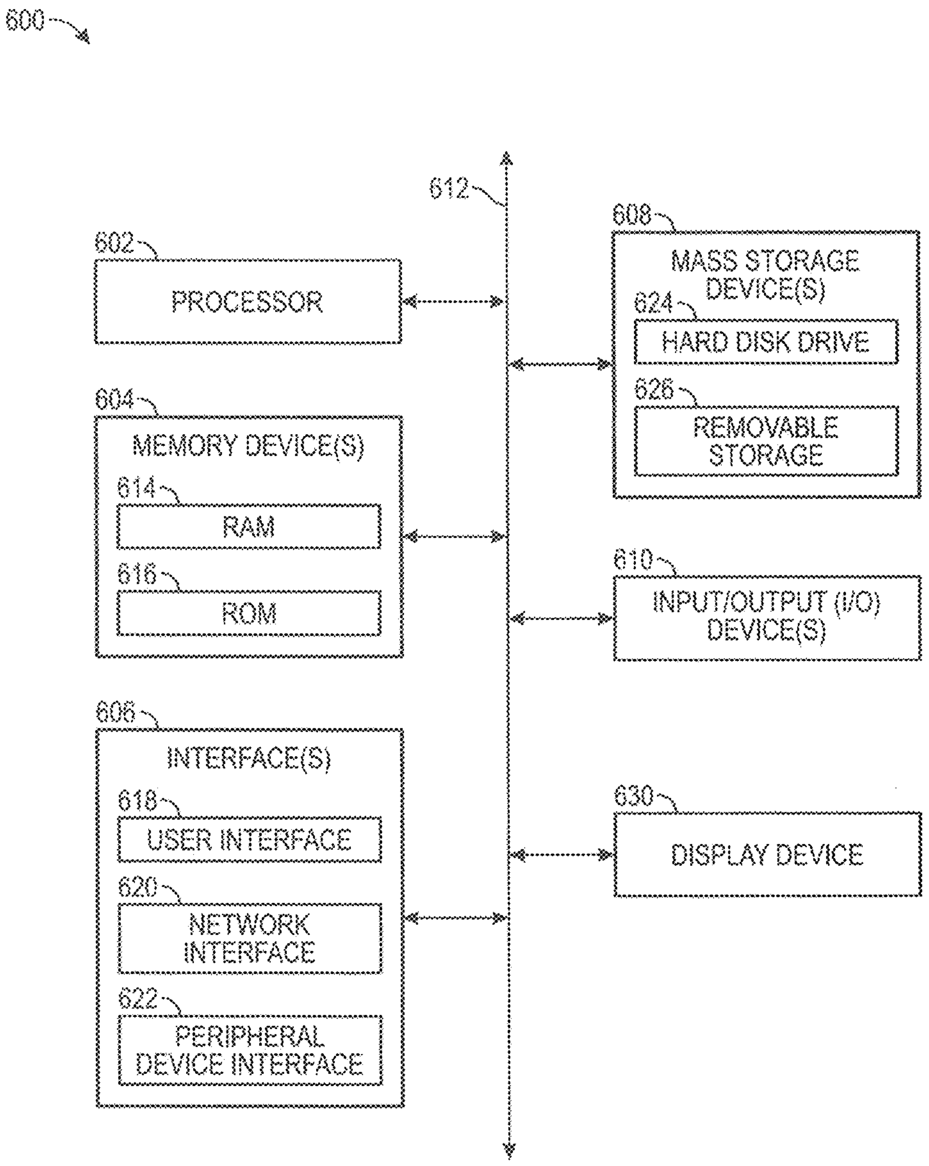
FIG. 6 illustrates an example block diagram of a computing device.

FIG. 6 illustrates an example block diagram of a computing device 600. Computing device 600 can be used to perform various procedures, such as those discussed herein. Computing device 600 can function as a server, a client, or any other computing entity. Computing device 600 can perform various communication and data transfer functions as described herein and can execute one or more application programs, such as the application programs described herein. Computing device 600 can be any of a wide variety of computing devices, such as a mobile telephone or other mobile device, a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor (s) 602 include one or more processors or controllers that execute instructions stored in memory device(s) 604 and/or mass storage device(s) 608. Processor(s) 602 may also include various types of computer storage media, such as cache memory.

Memory device(s) 604 include various computer storage media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer storage media, such as magnetic tapes, magnetic disks, optical disks, solid state memory (e.g., Flash memory), and so forth. As depicted in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, barcode scanners, microphones, monitors or other display devices, speakers, printers, network interface cards, modems, cameras, lenses, radars, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments as well as humans. Example interface(s) 606 can include any number of different network interfaces 620, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 618 and peripheral device interface 622.

Bus 612 allows processor(s) 602, memory device(s) 604, interface(s) 606, mass storage device(s) 608, and I/O device (s) 610 to communicate with one another, as well as other devices or components coupled to bus 612. Bus 612 represents one or more of several types of bus structures, such as a system bus, PCI bus, IEEE 1394 bus, USB bus, and so forth.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, cellular base station IDs, KPIs, counters, cellular base station usage, vectorized scores, performance scores, predicted performance scores, cell performance indices, cell health indices, parameter configurations, parameter change recommendations, site databases, cellular base station characteristics, cellular base station associated conditions, notifications, performance check requests, application outputs, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, cellular base station IDs, KPIs, counters, cellular base station usage, vectorized scores, performance scores, predicted performance scores, cell performance indices, cell health indices, parameter configurations, parameter change recommendations, site databases, cellular base station characteristics, cellular base station associated conditions, notifications, performance check requests, application outputs, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer implemented method comprising:

accessing a plurality of operational parameters of a first cellular base station in a cellular network, the plurality of operational parameters comprising one or more characteristics and one or more conditions;

identifying, using a trained artificial intelligence (AI) model, a plurality of similarly situated cellular base stations connected to the cellular network, the plurality of similarly situated cellular base stations having operational parameters similar to the plurality of operational parameters of the first cellular base station;

accessing a plurality of previously derived cellular base station performance scores, including accessing a previously derived cellular base station performance score for each of the plurality of similarly situated cellular base stations the plurality of previously derived cellular base station performance scores including a previously derived cellular base station performance score corresponding to the first cellular base station and one or more other previously derived cellular base station performance scores;

comparing the plurality of previously derived cellular base station performance scores to one another;

calculating that the previously derived cellular base station performance score varies by more than a specified threshold from the one or more other previously derived cellular base station performance scores; and determining that the first cellular base station is not delivering optimum performance based at least on the previously derived cellular base station performance score varying by more than the specified threshold from the one or more other previously derived cellular base station performance scores.

2. The method of claim 1, further comprising:

accessing key performance indicators (KPIs) for each of the plurality of similarly situated cellular base stations;

accessing counters for each of the plurality of similarly situated cellular base stations;

deriving a plurality of cell performance indices including deriving cell performance index for each of the plurality of similarly situated cellular base stations from corresponding KPIs;

deriving a plurality of cell health indices including deriving a cell health index for each of the plurality of similarly situated cellular base stations from corresponding counters;

deriving the plurality of previously derived cellular base station performance scores from the plurality of cell performance indices and the plurality of cell health indices; and storing the plurality of previously derived cellular base station performance scores in a database.

3. The method of claim 2, wherein accessing the plurality of previously derived cellular base station performance scores comprises accessing the plurality of previously derived cellular base station performance scores from the database.

4. There method of claim 2, wherein accessing KPIs for each of the plurality of similarly situated cellular base stations comprises accessing KPIs corresponding to one or more of: accessibility, retainability, integrity, availability, and mobility of the cellular network.

5. The method of claim 2, wherein accessing the counters for each of the plurality of similarly situated cellular base stations comprises access counters in one or more categories selected from among: access failures, access rejections, usage, throughput, transport, and radio environment.

6. The method of claim 1, wherein accessing the plurality of previously derived cellular base station performance scores comprises accessing a plurality of vectorized scores; and wherein calculating that the previously derived cellular base station performance score varies by more than the specified threshold from the one or more other previously derived cellular base station performance scores comprises using a cosine similarity function.

7. The method of claim 1, wherein the operational parameters of the plurality of similarly situated cellular base stations are within a required similarity to one another due to the plurality of similarly situated cellular base stations being located on similar terrain.

8. The method of claim 1, wherein the operational parameters of the plurality of similarly situated cellular base stations are within a required similarity to one another due to the plurality of similarly situated cellular base stations being positioned at similar heights.

9. The method of claim 1, wherein the operational parameters of the plurality of similarly situated cellular base stations are within a required similarity to one another due to the plurality of similarly situated cellular base stations having similar tilts.

10. The method of claim 1, further comprising evaluating, by the trained AI model, the plurality of operational parameters of the plurality of similarly situated cellular base stations, the plurality of operational parameters including all of locations, heights, base station tilts, antenna databases, antenna azimuth separation, and clutter.

11. A computer implemented method comprising:

detecting that a first cellular base station has been added to cellular network;

accessing a plurality of operational parameters of the cellular base station, the plurality of operational parameters comprising one or more characteristics and one or more conditions;

identifying, using a trained artificial intelligence (AI) model, one or more similarly situated cellular base stations connected to the cellular network, the one or more similarly situated cellular base stations having operational parameters similar to the plurality of operational parameters of the first cellular base station;

accessing one or more previously derived performance scores, including accessing a previously derived performance score for each of the one or more similarly situated cellular base stations;

deriving, using the trained AI model, a current performance score for the first cellular base station based on the plurality of operational parameters of the first cellular base station; and predicting performance of the first cellular base station on the cellular network based at least on the current performance score.

12. The method of claim 11, further comprising:

accessing key performance indicators (KPIs) for each of the one or more similarly situated cellular base stations;

accessing counters for each of the one or more similarly situated cellular base stations;

deriving one or more cell performance indices including deriving cell performance index for each of the one or more similarly situated cellular base stations from corresponding KPIs;

deriving one or more cell health indices including deriving a cell health index for each of the one or more similarly situated cellular base stations from corresponding counters;

deriving the one or more previously derived performance scores from the one or more cell performance indices and the one or more cell health indices; and storing the one or more previously derived performance scores in a database.

13. The method of claim 11, further comprising:

inputting the plurality of operational parameters of the first cellular base station and the one or more previously derived performance scores into the trained AI model;

selecting, using the trained AI model, one or more relevant performance indicators associated with a performance of the first cellular base station based on the inputting;

generating, using the trained AI model, a threshold associated with each of the one or more relevant performance indicators based on the one or more previously derived performance scores; and deriving, using the trained AI model, the current performance score for the first cellular base station as a vector based on the one or more relevant performance indicators and the threshold associated with each of the one or more relevant performance indicators.

14. There method of claim 12, wherein accessing the KPIs for each one or more similarly situated cellular base stations comprises accessing KPIs corresponding to one or more of: accessibility, retainability, integrity, availability, and mobility of the cellular network.

15. The method of claim 12, wherein accessing the counters for each of the one or more similarly situated cellular base stations comprises accessing counters in one or more categories selected from among: access failures, access rejections, usage, throughput, transport, and radio environment.

16. The method of claim 11, wherein accessing the one or more previously derived performance scores comprises accessing a plurality of vectorized scores.

17. The method of claim 11, wherein identifying the one or more similarly situated cellular base stations comprises determining the one or more similarly situated cellular base stations are located on similar terrain.

18. The method of claim 11, wherein identifying the one or more similarly situated cellular base stations comprises determining the one or more similarly situated cellular base stations are positioned at similar heights.

19. The method of claim 11, wherein identifying the one or more similarly situated cellular base stations comprises determining the one or more similarly situated cellular base stations have similar tilts.

20. The method of claim 11, wherein the cellular network is a 5G network.

* * * * *